US012664471B2

(12) United States Patent (10) Patent No.: US 12,664,471 B2

Edakunni et al. (45) Date of Patent: Jun. 23, 2026

(54) MACHINE LEARNING MODEL ANALYSIS

(71) Applicant: American Express Travel Related Services Company, Inc., New York, NY (US)

(72) Inventors: Narayanan Unny Edakunni, Bengaluru (IN); Lalitha K S, Bengaluru (IN); Utkarsh Tekriwal, Bengaluru (IN)

(73) Assignee: American Express Travel Related Services Company, Inc., New York, NY (US)

( * ) Notice: Subject to any disclaimer, the term of this patent is extended or adjusted under 35 U.S.C. 154(b) by 659 days.

(21) Appl. No.: 18/087,456

(22) Filed: Dec. 22, 2022

(65) Prior Publication Data

US 2024/0211795 A1     Jun. 27, 2024

(51) Int. Cl.
    *G06N 20/00*              (2019.01)
(52) U.S. Cl.
    CPC .................................... *G06N 20/00* (2019.01)
(58) Field of Classification Search
    CPC ..................................................... G06N 20/00

USPC ........................................................... 706/12
See application file for complete search history.

(56) References Cited

U.S. PATENT DOCUMENTS

| | | | |
|---|---|---|---|
| 12,118,456 B1 * | 10/2024 | Genc | G06N 3/045 |
| 2019/0279097 A1 * | 9/2019 | Baines | G06F 16/9027 |
| 2019/0378210 A1 * | 12/2019 | Merrill | G06N 5/01 |
| 2020/0302318 A1 * | 9/2020 | Hetherington | G06N 20/20 |
| 2020/0327357 A1 * | 10/2020 | Karnagel | G06F 18/2148 |

* cited by examiner

*Primary Examiner* — Muluemebet Gurmu
(74) *Attorney, Agent, or Firm* — Thomas | Horstemeyer, LLP

(57) ABSTRACT

Disclosed are various embodiments for analyzing machine learning models. A selection is obtained of a first tuple comprising a first feature vector and a first result generated by a machine learning model and a second tuple comprising a second feature vector and a second result generated by the machine learning model. Then, a plurality of emulated feature vectors are generated. Next, a plurality of emulated results are generated. Subsequently, a plurality of emulated decision instances are generated. Next, a decision tree is built based at least in part on the first tuple, the second tuple, and the plurality of emulated decision instances. Finally, an importance of each feature on the decision tree is computed.

17 Claims, 4 Drawing Sheets

User Interface 156 https://analytics.example.com/selection.html

Please Provide Search Criteria for Machine Learning Analysis

- Date Range
- Decision Identifiers

User Interface 156 https://analytics.example.com/selection.html

Please Select Features for Machine Learning Analysis

☐ All Features

☐ Feature A

☐ Feature B

☐ Feature C

☐ Feature D

☐ Feature E

MACHINE LEARNING MODEL ANALYSIS

BACKGROUND

As machine learning becomes more advanced, it is often used to address larger, more important, or more complex problems. This can result in incredibly complicated machine learning models being developed and deployed. However, many of these machine learning models can be so complicated that they often operate as a black box.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for analyzing machine learning models. Sophisticated or complicated machine-learning models are often difficult to analyze due to their complexity. For example, while a data analyst or data scientist may be aware of the values for the inputs to a machine learning model, and know the operational parameters and design of the machine learning model, it may be difficult or impossible to determine why a machine learning model provided a specific result based on a given input. As a result, the operation of the machine learning model could be a considered to be a black box.

However, there are many instances in which a data analyst or data scientist needs to determine what the reason or likely reason is that a machine learning model provided a particular result given a particular input. For example, machine learning models are often used by financial institutions to decide whether to approve or deny credit applications based on the modeled credit risk of an applicant. However, there can be instances where an applicant may be approved for credit one time, but denied credit a short time later without any apparent change in the credit risk of the applicant. Accordingly, a data analyst or data scientist could be tasked with determining what changes in the inputs to the machine learning model caused the resulting change in the decision of the machine learning model. However, due to the complicated and black box nature of the machine learning model, the data analyst may be unable to determine which changes in the inputs to the machine learning model caused the resulting change in the decision of the machine learning model using traditional techniques.

The various embodiments of the present disclosure provide automated tools for generating simplified machine learning models that emulate or otherwise predict the result of another, more complicated machine learning model for a given set of inputs. The generated machine learning model can then be analyzed to determine which changes to the inputs of the other, more complicated machine learning model caused the change in its decision or output.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
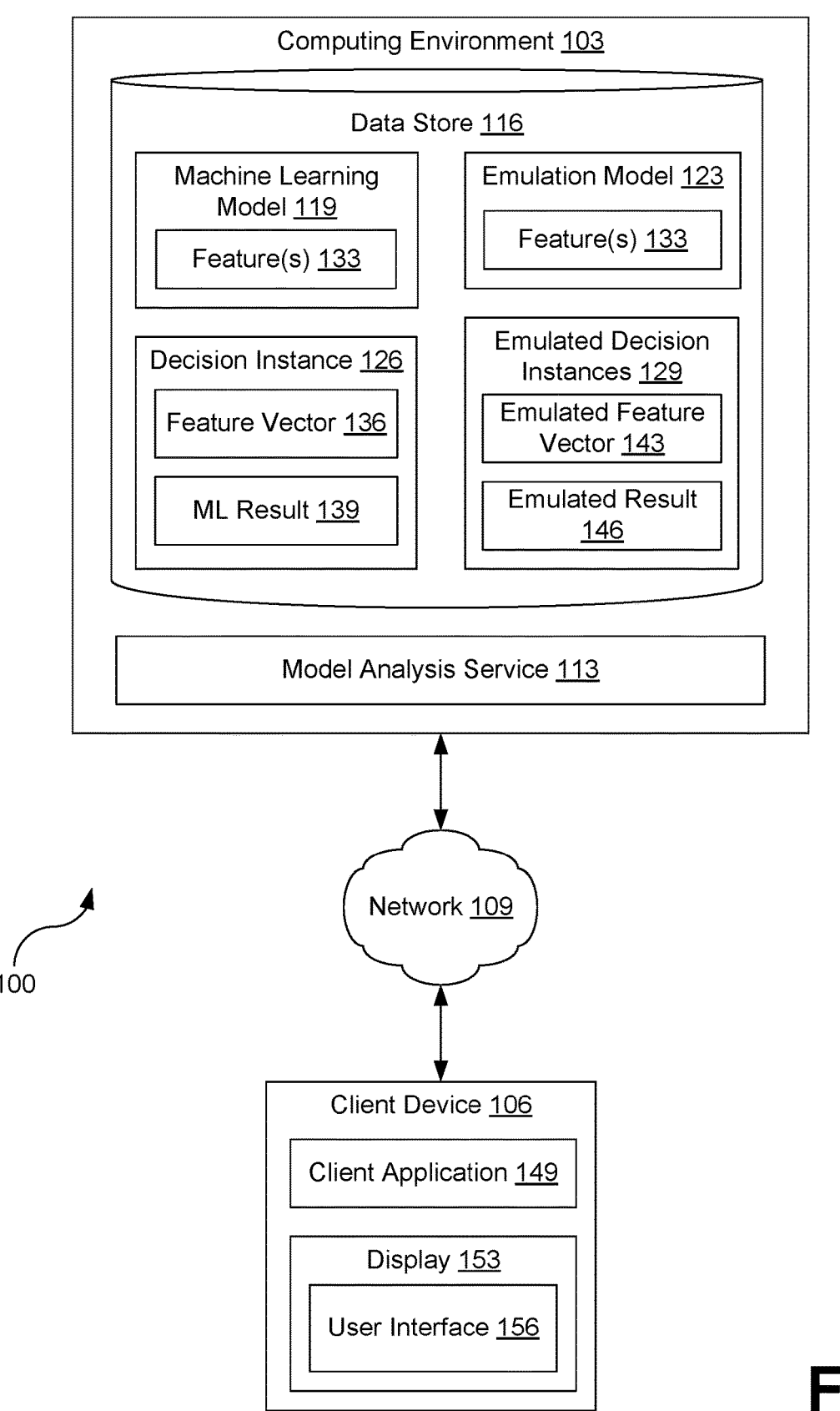
FIG. 1 is a drawing of a network environment according to various embodiments of the present disclosure.

With reference to FIG. 1, shown is a network environment 100 according to various embodiments. The network environment 100 can include a computing environment 103 and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a model analysis service 113, and other applications, services, processes, systems, engines, or functionality not discussed in detail herein.

Also, various data is stored in a data store 116 that is accessible to the computing environment 103. The data store 116 can be representative of a plurality of data stores 116, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 116 is associated with the operation of the various applications or functional entities described below. This data can include one or more machine learning models 119, one or more emulation models 123, decision instance 126, emulated decision instances 129, and potentially other data.

A machine learning model 119 can represent a model or algorithm for generating a prediction or a classification based on input data. The machine learning model 119 can specify one or more features 133, which describe or define the input data for the machine learning model 119, as well as the algorithm for how to generate a prediction or classification based on the values of the features 133 provided as inputs to the algorithm. Examples of machine learning models 119 can include neural network models (e.g., recurrent neural networks, convolutional neural networks, etc.), decision tree learning models (e.g., regression trees, classification trees, boosted trees, bootstrap aggregated decision trees, random forests, rotation forests, etc.), Bayesian networks, support-vector machines, etc.

An emulation model 123 can represent any machine learning model that is created and used by the model analysis service 113 to model or predict the behavior of the machine learning model 119. Examples of emulation models 123 can include decision tree learning models (e.g., regression trees, classification trees, boosted trees, bootstrap aggregated decision trees, random forests, rotation forests, etc.). The emulation model 123 can also specify the same features 133 as those specified by the machine learning model 119 in order to allow the emulation model 123 to accurately model or predict the behavior of the machine learning model 119.

Decision instances 126 represent the data associated with any decision or result generated by the machine learning model 119. Each decision instance can include a feature vector 136 and a respective machine learning result 139. The feature vector 136 can represent the vector of values submitted as inputs for the features 133 defined by the machine learning model 119. The machine learning result 139 can represent the prediction or decision of the machine learning model 119 in response to the feature vector 136 provided to the machine learning model 119. Accordingly, a decision instance 126 can be considered to be a tuple defined by the combination of a feature vector 136 and a respective machine learning result 139.

Emulated decision instances 129 represent the data associated with results of the machine learning model 119 in response to emulated feature vectors 143 that are provided as an inputs to the machine learning model 119. Each emulated feature vector 143 can represent a vector of values submitted as inputs for the features 133 defined by the machine learning model 119. Each emulated decision instance 129 can have its own emulated feature vector 143 that is randomly generated, but based at least in part on, a selected decision instance 126, as described in detail later.

Each emulated decision instance 129 can also have an emulated result 146, which reflects the prediction or decision of the machine learning model 119 in response to the emulated feature vector 143 being provided as an input. Accordingly, an emulated decision instance 129 can be considered to be a tuple defined by the combination of an emulated feature vector 143 and a respective emulated result 146.

The model analysis service 113 can be executed to analyze the behavior of the machine learning model 119 in response to changes in the values of emulated feature vectors 143 provided to the machine learning model 119 as inputs. This can be done by creating an emulation model 123 and training the emulation model 123 using a set of emulated decision instances 129 as the training data for the emulation model 123, as described in further detail later. Once the emulation model 123 is created and trained, the model analysis service 113 can analyze the emulation model 123 to identify which features 133 have the greatest impact on any results generated by the emulation model 123. The identified features 133 can be provided as a report to a client application 149 executing on the client device 106 or saved to a database or other data repository.

The client device 106 is representative of a plurality of client devices that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 153, such as liquid crystal displays (LCDs), gas plasma-based flat panel displays, organic light emitting diode (OLED) displays, electrophoretic ink ("E-ink") displays, projectors, or other types of display devices. In some instances, the display 153 can be a component of the client device 106 or can be connected to the client device 106 through a wired or wireless connection.

The client device 106 can be configured to execute various applications such as a client application 149 or other applications. The client application 149 can be executed in a client device 106 to access network content served up by the computing environment 103 or other servers, thereby rendering a user interface 156 on the display 153. To this end, the client application 149 can include a browser, a dedicated application, or other executable, and the user interface 156 can include a network page, an application screen, or other user mechanism for obtaining user input. The client device 106 can be configured to execute applications beyond the client application 149 such as email applications, social networking applications, word processors, spreadsheets, or other applications.

Next, a general description of the operation of the various components of the network environment 100 is provided. Although the following description describes an example of the interaction between the various components of the present disclosure, other interactions or operations are also possible and within the scope of the disclosure.

To begin, the client application 149 can be used to select two decision instances 126 for the basis of an analysis by the model analysis service 113. For example, if the decision instances 126 reflected credit decisions for a customer by a financial institution at two different points in time, a user of the client application 149 could select two decision instances 126 representing two separate credit decisions for the same customer at two different points in time in order to determine which features had the largest impact on any difference in the two respective machine learning results 139 (e.g., why a customer was approved to receive credit one time and denied another time). It should be noted that although the use of two decision instances 126 is described for illustrative purposes, additional decision instances could be selected. For example, one could select multiple decision instances related to the same individual to determine which features 133 were most impactful over time. As another example, two groups of decision instances 126 could be selected. For instance, a first group of decision instances 126 representing decisions by the machine learning model 119 at a first point in time and a second group of decision instances 126 representing decisions by the machine learning model 119 at a second point in time could be selected (e.g., a first set of credit decisions made for a group of customers prior to a global pandemic or economic recession and a second set of credit decisions made for the same group of customers after the global pandemic or economic recession).

The model analysis service 113 can then generate a plurality of emulated decision instances 129 based at least in part on the selected decision instances 126. For example, for each value in a first feature vector 136 of a first decision instance 126 or a second feature vector 136 of a second decision instance 126, the model analysis service 113 could randomly select a value of either the first feature vector 126 or the second feature vector for use for a respective feature in the emulated feature vector 143 of an emulated decision instance 129. The number of emulated decision instances 129 can vary based on the possible number of combinations of the first feature vector 136 and the second feature vector 136. For a small number of features in the feature vectors 136, the model analysis service 113 could create a number of emulated decision instances 129 equal to the possible number of combinations of values of the first feature vector 136 and the second feature vector 136. Where the feature vectors 136 contain a large number of features, the model analysis service 113 could randomly created a predefined or previously specified number of emulated decision instances 129 in order to make the amount of data to be used to train the emulation model 123 feasible.

After creating the emulated decision instances 129, the model analysis service 113 can use the emulated decision instances 129 to build and/or train the emulation model 123. For example, if the emulation model 123 were a decision tree (e.g., a regression tree), then the emulated decision instances 129 could be used to build the decision tree, as described in further detail later.

Once the emulation model 123 is created, the model analysis service 113 can use various model evaluation techniques to determine which features 133 of the emulation model 123 have the largest impact on the results generated by the emulation model 123. One example of an evaluation technique is the Tree SHAP (Shapley Additive exPlanation) algorithm. The model analysis service 113 could then rank or otherwise order the features 133 based on their relative impact and generate a report detailing the results. The report could be provided to the client application 149 for display, stored in a database or repository for future analysis or review, etc.

Figure 2:
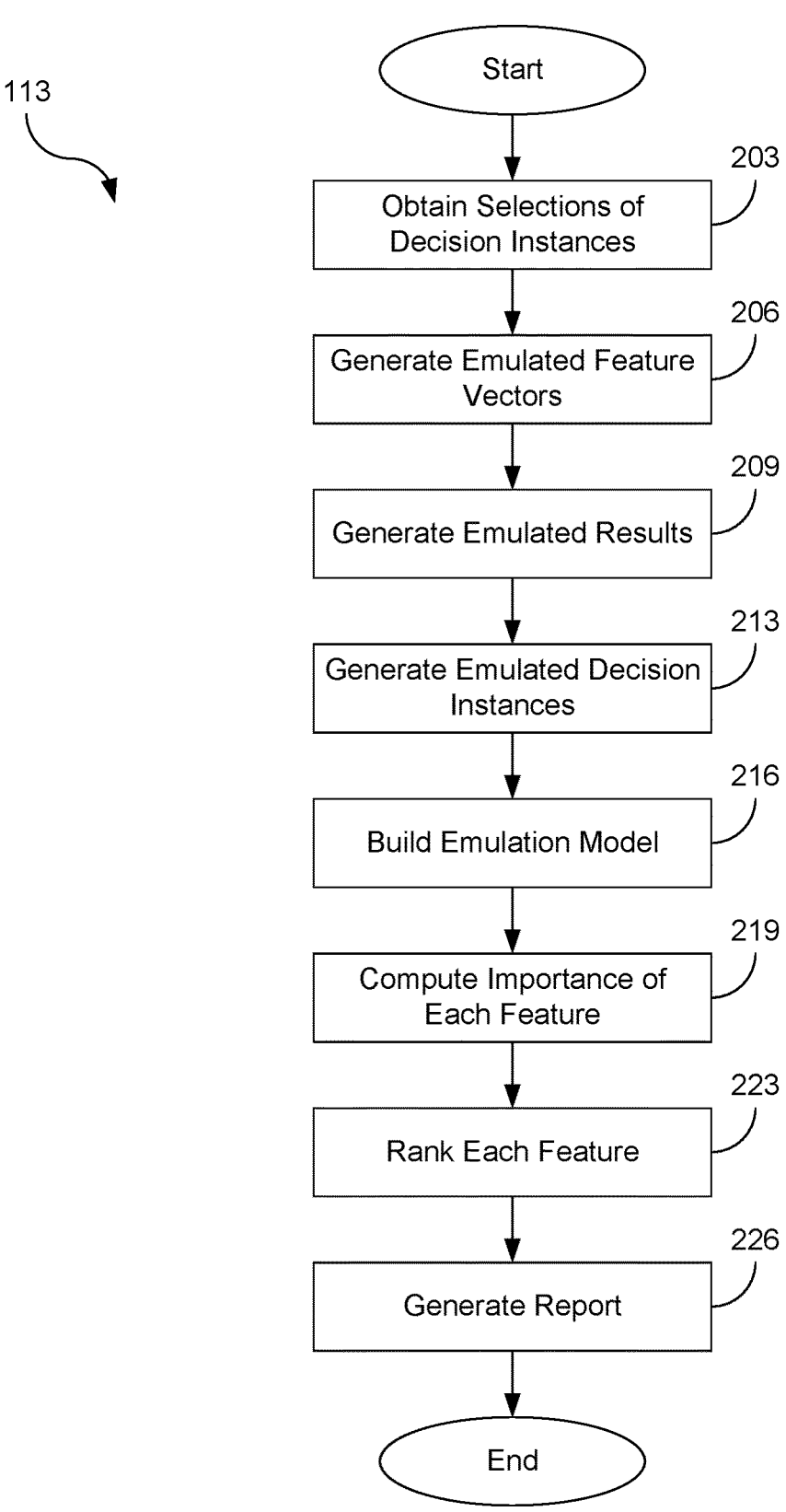
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the model analysis service 113. The flowchart of FIG. 2 provides merely an example of the many different types of functional arrangements that can be employed to implement the operation of the depicted portion of the model analysis service 113. As an alternative, the flowchart of FIG. 2 can be viewed as depicting an example of elements of a method implemented within the network environment 100.

Beginning with block 203, the model analysis service 113 can obtain the selection of one or more decision instances 126. For example, if a data analyst wanted to investigate the likely cause of a change in a machine learning result 139 between a first decision instance 126 and a second decision instance 126, the data analyst could use the client application 149 to specify the decision instances 126 to be analyzed. The model analysis service 113 could then retrieve the decision instances 126 from the data store 116 for subsequent use.

At block 203, the model analysis service 113 could also obtain a selection of features 133 of the machine learning model 119 to analyze. In some instances, the model analysis service 113 could be used to analyze the impact of all of the features 133 of the machine learning model 119. However, in other instances, a data scientist or data analyze might only want to investigate the impact of a subset of the features 133 of the machine learning model 119. In these instances, the data analyze could use the client application 149 to specify the features 133 to be analyzed, and the client application 149 could provide them to the model analysis service 113.

Then, at block 206, the model analysis service 113 can generate a plurality of emulated feature vectors 143 based at least in part on the feature vectors 136 of the decision instances 126 obtained at block 203. Continuing the example where two decision instances 126 were selected, this can be done by randomly selecting values of the first feature vector 136 of the first decision instance 126 and the second feature vector 136 of the second decision instance 126 to generate an emulated feature vector 143. For instance, if the first feature vector 136 had values {a, b, c} and the second feature vector 136 had values {x, y, z}, then a first emulated feature vector 143 could contain the values {x, y, c}, a second emulated feature vector 143 could contain the values {a, y, z}, etc. This process could be used regardless of whether all the features 133 of the machine learning model 119 or a subset of the features 133 of the machine learning model 119 are to be analyzed.

In some instances, feature vectors 143 can include a large number of features. If there are n features in the first feature vector 136 and the second feature vector 136, then there are $2^n$ possible combinations of features. However, for large values of n, it is not feasible to generate all possible combinations of values for features from the first feature vector 136 and the second feature vector 136. In these situations, random combinations of the features may be generated in order to sample a subset of all possible combinations. The number of samples in the subset could be predefined (e.g., as predefined faction or percentage of possible combinations) or could be specified by a user (e.g., at block 203 when a user specifies the decision instances 126 to be used).

Moving on to block 209, the model analysis service 113 can then generate emulated results 146 for each of the emulated feature vectors 143 created at block 206. For example, the model analysis service 113 could supply each emulated feature vector 143 to the machine learning model 119 and store the result as a respective emulated result 146 for the feature vector 143.

Consequently, at block 213, the model analysis service 113 can create and store emulated decision instances 129 for subsequent use. For example, the model analysis service 113 could create and store an emulated decision instance 129 that includes each emulated feature vector 143 generated at block 206 and each respective emulated result 146 generated at block 209.

Proceeding to block 216, the model analysis service 113 can then build an emulation model 123. The emulation model 123 can be created to include all of the features 133 of the machine learning model 119 or a subset of the features 133 of the machine learning model 119 that were specified or otherwise obtained at block 203. Once the emulation model 123 is built, it can be trained using the emulated decision instances created and stored at block 213.

For example, if the emulation model 123 were a decision tree (e.g., a regression tree), then the emulated decision instances 123 could be used to build the decision tree. In this example, in each step of building the emulation model 123, the data could be partitioned to left and right subtrees such that the variance of the emulated result 146 in each partition is minimized. Hence, the model analysis service 113 could choose one of the features 133 that best distinguishes between the two realms of the emulated result 146. Because the emulated feature vector 143 for each emulated decision instance 123 has a value that comes from either a first feature vector 136 or a second feature vector 136, the data in of the decision tree would be split between the left and right subtrees based at least in part on whether the value of the emulated feature vector 143 comes from the first feature vector 136 or the second feature vector 136. Among all possible features 133 that could be used to split the decision tree, the feature 133 that provides the largest discrimination could be chosen. This in turn means that the feature 133 chosen induces the biggest difference between the outputs of data containing the value from the first feature vector 136 compared to the data that contains the value from the second feature vector 136. This would imply that the feature 133 chosen would be the biggest driver of the difference between the first machine learning result 139 of the first decision instance 126 and the second machine learning result 139 of the second machine learning result 139 of the second decision instance 126. Such a feature 133 would therefore represent a good driver of any changes in the machine learning result 139 between the first decision instance 126 and the second decision instance 126. Once the first split has been performed on the root node of the decision tree, the emulated decision instances 123 could be recursively partitioned at each of the predecessor nodes of the root node with the same logic applied at each split. This results in the emulation model 123, in the form of a decision tree, being able to identify features 133 that are instrumental in the change in the machine learning result 139 between the first decision instance 126 and the second decision instance 126. Such a decision tree therefore emulates the behavior of the machine learning model 119 in the vicinity of the neighborhood of the two decision instances 126 being compared.

Next, at block 219, the model analysis service 113 can compute the importance of each feature 133 included in the emulation model 123 to the output of the emulation model 123, which would also indicate the importance of each feature 133 of the machine learning model 119 to the change in the machine learning result 139 between the first decision instance 126 and the second decision instance 126. This could be done using a variety of approaches. For example, the model analysis service 113 could perform a Tree SHAP (Shapley Additive exPlanation) analysis on the emulation model 123 if the emulation model 123 were a decision tree.

Then, at block 223, the model analysis service 113 can rank each feature 133 of the emulation model 123 based at least in part on the importance of each feature calculated at block 219. For example, if a feature 133 were 57% responsible for the change in the machine learning result 139 between the first decision instance 126 and the second decision instance 126, then it could be given a score of 57/100.

Subsequently, at block 226, the model analysis service 113 can prepare a report based on the rank of each feature 133 of the emulation model 123. The report could, for example, provide a ranked or sorted listing of each feature 133 by its importance, as well as the relative degree or value of its importance relative to other features. The report could be provided to the client application 149 executing on the client device, or it could be saved locally in the data store 116 for future reference. The process could then end.

Figures 3A, 3B:
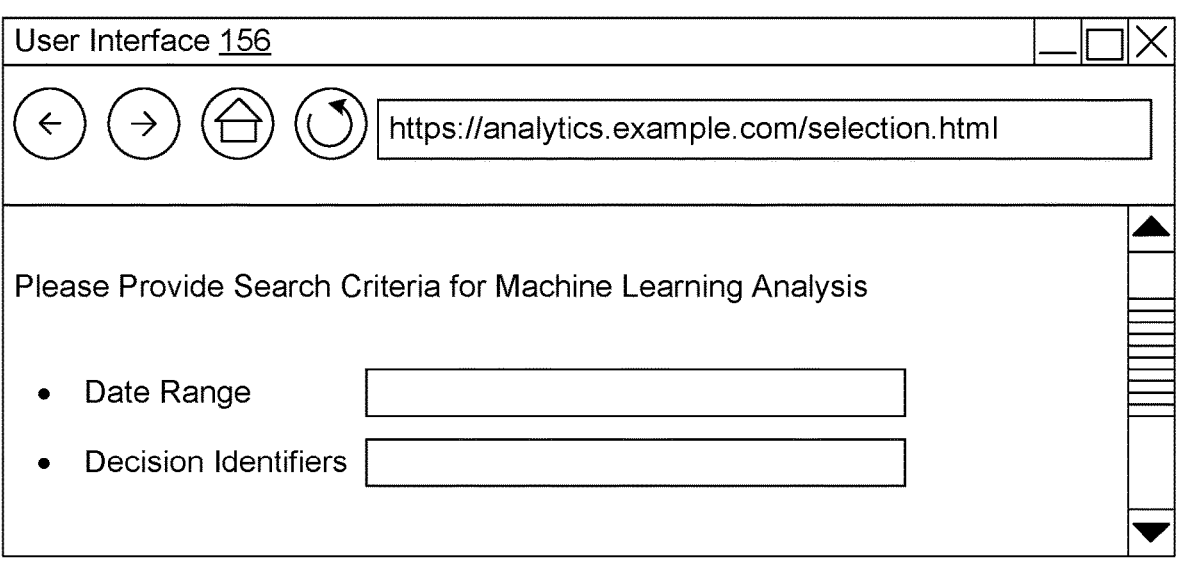
FIG. 3A is a pictorial diagram of an example user interface rendered by a client in the network environment of FIG. 1 according to various embodiments of the present disclosure.
FIG. 3B is a pictorial diagram of an example user interface rendered by a client in the network environment of FIG. 1 according to various embodiments of the present disclosure.

FIG. 3A depicts an example of a user interface 156 that could be presented on a display 153 of a client device 106 by the client application 149. The user interface 156 can provide one or more search fields that could allow a user to search for decision instances 126 to compare. For example, a user could input a date range to search for, one or more decision identifiers (e.g., customer identifiers), and potentially other data. In response to the search criteria, the user could receive a list of matching decision instances 126. For example, if a data analyst wanted to determine why a customer was denied credit ten days after being approved for credit, the data analyst could provide a date range that includes the ten-day time period and also include the customer identifier.

FIG. 3B depicts an example of a user interface 156 that could be presented on a display 153 of a client device 106 by the client application 149. The user interface 156 of FIG. 3B would allow for a user to select which features 133 of a machine learning model 119 should be analyzed. For example, if a data scientist wished to analyze all the feature 133 of the machine learning model 119, all of the features 133 could be selected. However, if the data scientist wished to analyze the relative importance of a subset of the features 133, then those specific features 133 could be selected using the user interface 156 depicted in FIG. 3B.

Figure 4:
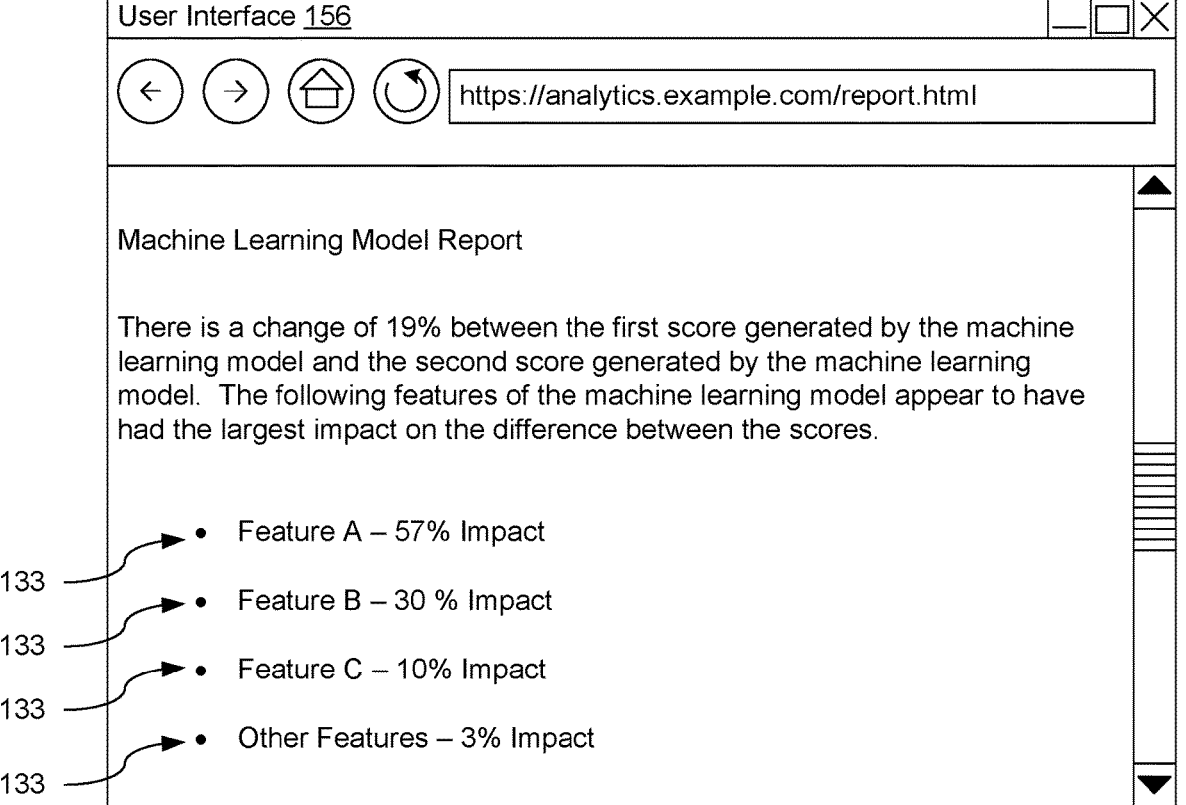
FIG. 4 is a pictorial diagram of an example user interface rendered by a client in the network environment of FIG. 1 according to various embodiments of the present disclosure.

FIG. 4 depicts an example of a user interface 156 that could be presented on a display 153 of a client device 106 by the client application 149. The user interface 156 can present the results of the report generated at block 226 of FIG. 2 by the model analysis application 113. The report could identify individual features 133 of the machine learning model 119 and rank them by relative importance to the difference between the machine learning results 139 two different decision instances 126. Other information could also be included according to various embodiments of the present disclosure.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

obtain a selection of a first tuple comprising a first feature vector and a first result generated by a machine learning model and a second tuple comprising a second feature vector and a second result generated by the machine learning model;

generate a plurality of emulated feature vectors, each of the plurality of emulated feature vectors comprising a unique combination of features from the first feature vector and the second feature vector;

generate a plurality of emulated results, each of the plurality of emulated results resulting from providing a respective one of the plurality of emulated feature vectors to the machine learning model;

generate a plurality of emulated decision instances, each of the plurality of emulated decision instances comprising one of the additional predictions and the respective one of the plurality of emulated feature vectors;

build a decision tree based at least in part on the first tuple, the second tuple, and the plurality of emulated decision instances; and perform a Tree SHAP (Shapley Additive explanation) analysis on the decision tree to compute an importance of each feature on the decision tree.

2. The system of claim 1, wherein the machine-readable instructions further cause the computing device to at least:

rank each feature based at least in part on the importance of the feature on the decision tree; and generate a report that identifies each feature in ranked order and the importance of the feature on the decision tree.

3. The system of claim 2, wherein the machine-readable instructions further cause the computing device to at least provide the report to client device in data communication with the computing device.

4. The system of claim 1, wherein the machine-readable instructions that cause the computing device to generate the plurality of emulated feature vectors further cause the computing device to randomly generate a subset of feature vectors from the set of possible feature vectors.

5. The system of claim 1, wherein the machine-readable instructions further cause the computing device to at least obtain a selection of features of the machine learning model to include in the first feature vector, the second feature vector and the plurality of emulated feature vectors.

6. The system of claim 1, wherein the decision tree is a regression tree.

7. A method, comprising:

obtaining a selection of a first tuple comprising a first feature vector and a first result generated by a machine learning model and a second tuple comprising a second feature vector and a second result generated by the machine learning model;

generating a plurality of emulated feature vectors, each of the plurality of emulated feature vectors comprising a unique combination of features from the first feature vector and the second feature vector;

generating a plurality of emulated results, each of the plurality of emulated results resulting from providing a respective one of the plurality of emulated feature vectors to the machine learning model;

generating a plurality of emulated decision instances, each of the plurality of emulated decision instances comprising one of the additional predictions and the respective one of the plurality of emulated feature vectors; building a decision tree based at least in part on the first tuple, the second tuple, and the plurality of emulated decision instances; and performing a Tree SHAP (Shapley Additive explanation) analysis on the decision tree to compute an importance of each feature on the decision tree.

8. The method of claim 7, further comprising:

ranking each feature based at least in part on the importance of the feature on the decision tree; and generating a report that identifies each feature in ranked order and the importance of the feature on the decision tree.

9. The method of claim 8, further comprising providing the report to client device in data communication with a computing device.

10. The method of claim 7, wherein generating the plurality of emulated feature vectors further comprises randomly generating a subset of feature vectors from the set of possible feature vectors.

11. The method of claim 7, further comprising obtaining a selection of features of the machine learning model to include in the first feature vector, the second feature vector and the plurality of emulated feature vectors.

12. The method of claim 7, wherein the decision tree is a regression tree.

13. A non-transitory, computer-readable medium, comprising machine-readable instructions that, when executed by a processor of a computing device, cause the computing device to at least:

obtain a selection of a first tuple comprising a first feature vector and a first result generated by a machine learning model and a second tuple comprising a second feature vector and a second result generated by the machine learning model;

generate a plurality of emulated feature vectors, each of the plurality of emulated feature vectors comprising a unique combination of features from the first feature vector and the second feature vector;

generate a plurality of emulated results, each of the plurality of emulated results resulting from providing a respective one of the plurality of emulated feature vectors to the machine learning model;

generate a plurality of emulated decision instances, each of the plurality of emulated decision instances comprising one of the additional predictions and the respective one of the plurality of emulated feature vectors; build a decision tree based at least in part on the first tuple, the second tuple, and the plurality of emulated decision instances; and perform a Tree SHAP (Shapley Additive explanation) analysis on the decision tree to compute an importance of each feature on the decision tree.

14. The non-transitory, computer-readable medium of claim 13, wherein the machine-readable instructions further cause the computing device to at least:

rank each feature based at least in part on the importance of the feature on the decision tree; and generate a report that identifies each feature in ranked order and the importance of the feature on the decision tree.

15. The non-transitory, computer-readable medium of claim 13, wherein the machine-readable instructions that cause the computing device to generate the plurality of emulated feature vectors further cause the computing device to randomly generate a subset of feature vectors from the set of possible feature vectors.

16. The non-transitory, computer-readable medium of claim 13, wherein the machine-readable instructions further cause the computing device to at least obtain a selection of features of the machine learning model to include in the first feature vector, the second feature vector and the plurality of emulated feature vectors.

17. The non-transitory, computer-readable medium of claim 13, wherein the decision tree is a regression tree.

* * * * *